United States Patent
Ruwe et al.

(10) Patent No.: US 11,061,167 B2
(45) Date of Patent: Jul. 13, 2021

(54) HEADSET AND SYSTEM FOR AUTOMATICALLY GENERATING TURBULENCE REPORTS

(71) Applicant: Bose Corporation, Framingham, MA (US)

(72) Inventors: Matthew Ruwe, Hopedale, MA (US); Michael Salame, Waltham, MA (US)

(73) Assignee: Bose Corporation, Framingham, MA (US)

( * ) Notice: Subject to any disclaimer, the term of this patent is extended or adjusted under 35 U.S.C. 154(b) by 376 days.

(21) Appl. No.: 16/147,846

(22) Filed: Sep. 30, 2018

(65) Prior Publication Data

US 2020/0103550 A1    Apr. 2, 2020

(51) Int. Cl.
*G01W 1/00* (2006.01)
*H04R 1/10* (2006.01)

(52) U.S. Cl.
CPC ........ *G01W 1/00* (2013.01); *G01W 2001/003* (2013.01); *H04R 1/1008* (2013.01)

(58) Field of Classification Search
CPC . G01W 1/00; G01W 2001/003; H04R 1/1008
See application file for complete search history.

(56) References Cited

U.S. PATENT DOCUMENTS

| 2011/0257818 | A1* | 10/2011 | Ganz | G08G 5/0013 701/14 |
| 2012/0046009 | A1* | 2/2012 | Persson | H04M 1/05 455/404.2 |
| 2016/0133137 | A1 | 5/2016 | Rencher et al. | |

FOREIGN PATENT DOCUMENTS

EP    2378318    10/2011

OTHER PUBLICATIONS

International Search Report and the Written Opinion of the International Searching Authority, International Application No. PCT/US2019/053795, pp. 1-12, dated Jan. 2, 2020.

* cited by examiner

*Primary Examiner* — Elias Desta
(74) *Attorney, Agent, or Firm* — Bond, Schoeneck & King, PLLC (57) ABSTRACT

A pilot headset and system for automatically generating turbulence reports is provided. The turbulence reporting pilot headset includes a headset body having a motion sensor positioned therein that is adapted to collect motion data representative of changes in motion experienced by the headset body, and a motion data correlation module which is programmed, structured and/or configured to correlate the collected motion data to turbulence level data.

20 Claims, 8 Drawing Sheets

| Intensity | Aircraft Reaction | Reaction Inside Aircraft | Reporting Term-Definition |
|---|---|---|---|
| Light | Turbulence that momentarily causes slight, erratic changes in altitude and/or attitude (pitch, roll, yaw). Report as Light Turbulence;[1] or Turbulence that causes slight, rapid and somewhat rhythmic bumpiness without appreciable changes in altitude or attitude. Report as Light Chop. | Occupants may feel a slight strain against seat belts or shoulder straps. Unsecured objects may be displaced slightly. Food service may be conducted and little or no difficulty is encountered in walking. | Occasional-Less than 1/3 of the time. Intermittent-1/3 to 2/3. Continuous-More than 2/3. |
| Moderate | Turbulence that is similar to Light Turbulence but of greater intensity. Changes in altitude and/or attitude occur but the aircraft remains in positive control at all times. It usually causes variations in indicated airspeed. Report as Moderate Turbulence;[1] or Turbulence that is similar to Light Chop but of greater intensity. It causes rapid bumps or jolts without appreciable changes in aircraft altitude or attitude. Report as Moderate Chop.[1] | Occupants feel definite strains against seat belts or shoulder straps. Unsecured objects are dislodged. Food service and walking are difficult. | NOTE 1. Pilots should report location(s), time (UTC), intensity, whether in or near clouds, altitude, type of aircraft and, when applicable, duration of turbulence. 2. Duration may be based on time between two locations or over a single location. All locations should be readily identifiable. |
| Severe | Turbulence that causes large, abrupt changes in altitude and/or attitude. It usually causes large variations in indicated airspeed. Aircraft may be momentarily out of control. Report as Severe Turbulence.[1] | Occupants are forced violently against seat belts or shoulder straps. Unsecured objects are tossed about. Food Service and walking are impossible. | EXAMPLES: a. Over Omaha, 1232Z, Moderate Turbulence, in cloud, Flight Level 310, B787. |
| Extreme | Turbulence in which the aircraft is violently tossed about and is practically impossible to control. It may cause structural damage. Report as Extreme Turbulence.[1] | | b. From 50 miles south of Albuquerque to 30 miles north of Phoenix, 1210Z to 1250Z, occasional Moderate Chop, Flight Level 330, DC8. |

[1] High level turbulence (normally above 15,000 feet ASL) not associated with cumuliform cloudiness, including thunderstorms, should be reported as CAT (clear air turbulence) preceded by the appropriate intensity, or light or moderate chop.

HEADSET AND SYSTEM FOR AUTOMATICALLY GENERATING TURBULENCE REPORTS

BACKGROUND

The present disclosure is directed generally to air turbulence reporting and more particularly to pilot headsets adapted to sense turbulence data.

A pilot report (PIREP) is a report of weather and flying conditions (including turbulence) encountered in flight. This information is usually relayed by aircraft radio to the nearest ground station. However, when pilots are flying, a PIREP may only be completed by a pilot when time and work load permit. Also, when experiencing turbulence, it is less likely a pilot will have time at that moment to provide the turbulence data on a PIREP.

A PIREP will contain several data fields. The following is a list of the types of data fields typically included in a PIREP: UA or UUA used to identify the PIREP as routine or urgent; /OV location of the PIREP, in relation to a NAVAID, an aerodrome or geographical coordinates; /TM time the PIREP was received from the pilot (UTC); /FL flight level or altitude above sea level at the time the PIREP is filed; it is essential for turbulence and icing reports; /TP aircraft type; it is essential for turbulence and icing reports. Optionally, the following data can also be supplied in the PIREP: /SK sky cover; /TA ambient temperature; important for icing reports; /WV wind vector referenced in terms of true north (ICAO), or magnetic north; /TB turbulence; intensity, whether it occurred in or near clouds, and duration; /IC icing; /RM remarks; /WX flight visibility and weather. The existing weather, navigation (e.g., GPS), orientation (e.g., compass) and icing sensors on the aircraft can automatically supply data corresponding to those particular fields. Turbulence data, however, is manually entered/provided by a pilot.

SUMMARY

The present disclosure is directed to a turbulence reporting pilot headset and a system for automatically generating turbulence reports.

In one aspect, a headset system is provided. The headset system includes: a headset body having a motion sensor in communication therewith and configured to collect motion data representative of changes in motion of the headset body; and a motion data correlation module programmed, structured and/or configured to correlate the collected motion data to turbulence level data.

In an example, the motion sensor is adapted to collect motion data in each of the X, Y, and Z axes.

In an example, the motion data correlation module is positioned on or within the headset body.

In an example, the motion data correlation module is located remotely from the headset body.

In an example, the headset system further includes a transmitter for wirelessly transmitting the motion data from the motion sensor to the motion data correlation module.

In an example, the headset system further includes wired connection between the motion sensor and the motion data correlation module.

In another aspect, a system for reporting turbulence data is provided. The system includes: a headset having a motion sensor in communication therewith that is configured to collect motion data representative of changes in motion of the headset body; a motion data correlation module programmed, structured and/or configured to correlate the collected motion data to turbulence level data; and a pilot reporting module adapted to receive the turbulence level data and generate pilot reports.

In an example, the motion sensor is adapted to collect motion data in each of the X, Y, and Z axes.

In an example, the system further includes a database in which is stored baseline data of motion changes in the X, Y, and Z axes and corresponding turbulence levels.

In an example, the motion data correlation module compares the collected X, Y, and Z axis motion data to the baseline of X, Y, and Z motion data stored in the database for correlating the collected motion data to a turbulence level.

In an example, the system further includes a transmitter for wirelessly transmitting the motion data to the motion data correlation module.

In an example, the system further includes a wired connection between the motion sensor and the motion data correlation module.

In an example, the system further includes a transmitter for wirelessly transmitting the pilot reports to a receiving station.

In an example, the motion sensor is packaged in a module adapted to connect and draw power and communication functions to the pilot reporting module via the headset.

In a further aspect, a method for generating a turbulence report is provided. The methods includes the steps of: collecting motion data in a pilot headset representative of changes in motion of the headset; correlating the collected motion data to turbulence data; and reporting the turbulence data to a pilot reporting module and generating a pilot report.

In an example, the method further includes the step of providing a database that has stored therein baseline data of motion changes in the X, Y, and Z axes and corresponding turbulence levels.

In an example, the step of collecting motion data includes collecting motion data in X, Y, and Z axes.

In an example, the method further includes the step of comparing the collected X, Y, and Z axis data to the baseline data of motion changes in the X, Y, and Z axes for correlating to a turbulence level.

In an example, the step of correlating the collected motion data includes using a motion data correlation module programmed, structured and/or configured to correlate the collected motion data to turbulence level data.

In an example, the method further includes the step of assigning a turbulence level based on a correlation of the collected motion data to the turbulence level data.

The details of one or more implementations are set forth in the accompanying drawings and the description below. Other features, objects, and advantages will be apparent from the description and the drawings, and from the claims.

BRIEF DESCRIPTION OF THE DRAWINGS

FIG. 5 is a turbulence level correlation chart, in accordance with an example.

DETAILED DESCRIPTION

Figure 2:
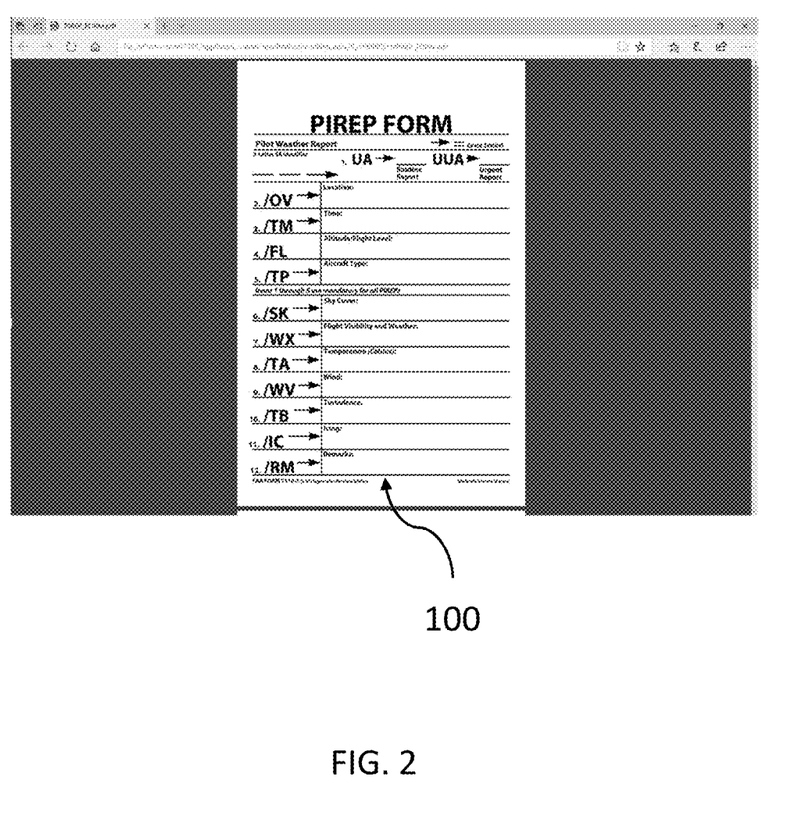
FIG. 2 is a representation of a pilot report, in accordance with an example.

The present disclosure describes a pilot headset 10 that senses turbulence and a system 100 for receiving turbulence data from headset 10 and automatically generating a pilot report (PIREP) 100 (see FIG. 2).

Figure 1A:
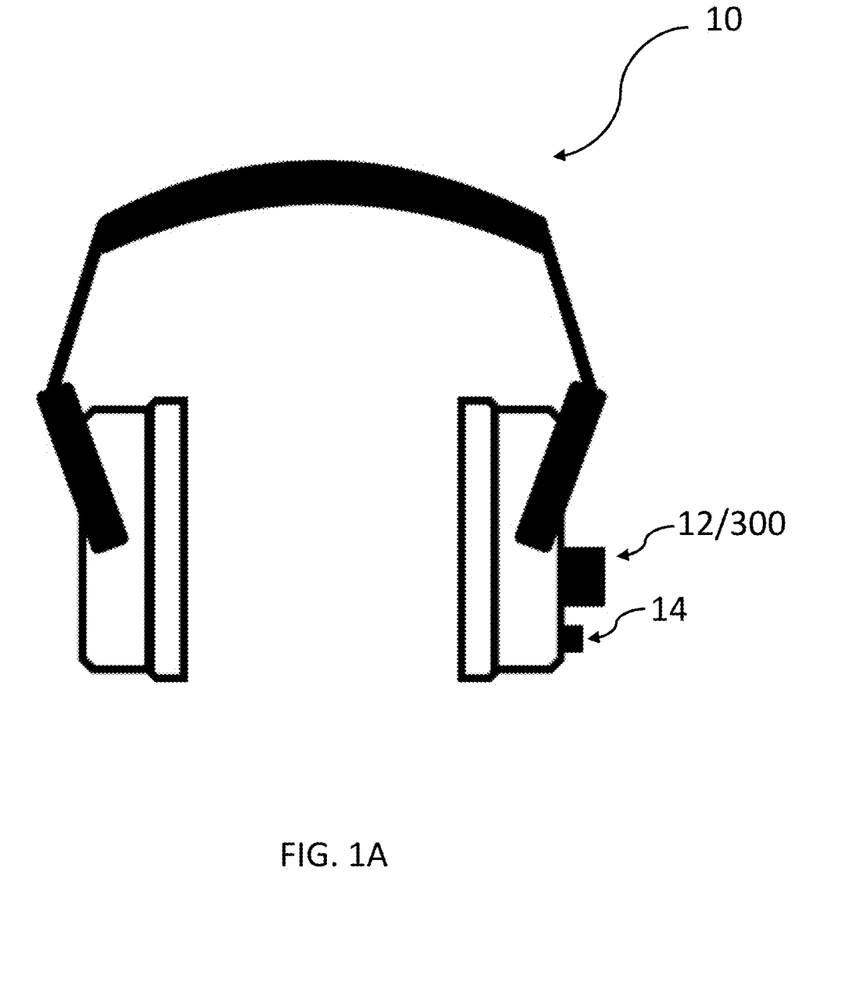
FIG. 1A is an elevation view and schematic representation of a pilot headset, in accordance with an example.
Figure 1B:
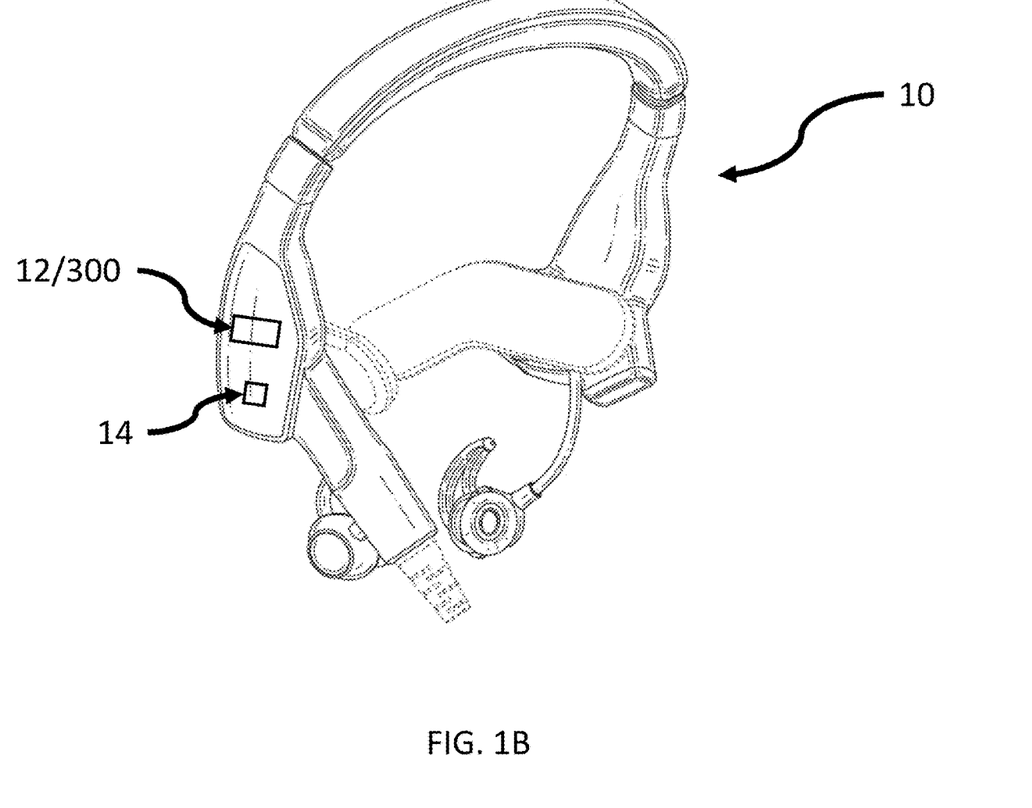
FIG. 1B is an elevation view and schematic representation of an alternate version of a pilot headset, in accordance with an example

Referring to FIGS. 1A and 1B, in alternate examples, is a pilot headset 10 that comprises a motion sensor 12 incorporated therein. Pilot headset 10 may comprise an over the ear type model (FIG. 1A) or an in-ear model (FIG. 1B), as well as any other form factor used on pilot headsets. Sensor 12 may be one or several accelerometers, an IMU, or any other type or combination of sensors adapted to sense changes in movement. When headset 10 is worn on the pilot's head, sensor 12 may collect data in real-time when changes to the altitude and/or attitude (pitch, roll and yaw positioning) occur and are sensed by the sensor 12 positioned on the headset 10. Preferably, sensor 12 is adapted to sense motion changes in the X (pitch), Y (yaw), and Z (roll) axes (e.g., an IMU) and collect linear and angular acceleration about the three axes. A data transmitter 14 adapted to transmit the motion data may also be equipped on headset 10. While the sensor 12 and data transmitter 14 are schematically shown in FIG. 1 as being mounted to an external surface of the headset 10, in other examples the sensor 12 and transmitter are contained within the headset 10, e.g., in an earcup, earbud, headband, and any connecting structures.

Aspects and implementations disclosed herein may be applicable to a wide variety of audio systems, such as headphones and other wearable audio devices in various form factors. A headphone refers to a device that fits around, on, or in an ear and that radiates acoustic energy into the ear canal. Headphones are sometimes referred to as earphones, earpieces, headsets, earbuds or sport headphones, and can be wired or wireless. A headphone includes an acoustic driver to transduce audio signals to acoustic energy. The acoustic driver may be housed in an earcup. While some of the figures and descriptions following may show a single headphone, a headphone may be a single stand-alone unit or one of a pair of headphones (each including a respective acoustic driver and earcup), one for each ear. A headphone may be connected mechanically to another headphone, for example by a headband and/or by leads that conduct audio signals to an acoustic driver in the headphone. A headphone may include components for wirelessly receiving audio signals. A headphone may include components of an active noise reduction (ANR) system. Headphones may also include other functionality such as a microphone so that they can function as a headset. While FIG. 1 shows an example of an around-ear headset, in other examples the headset may be an in-ear, on-ear, or near-ear headset.

Unless specified otherwise, the term wearable audio device, as used in this document, includes headphones and various other types of personal audio devices such as head, shoulder or body-worn acoustic devices (e.g., audio eyeglasses or other head-mounted audio devices) that include one or more acoustic drivers to produce sound, with or without contacting the ears of a user. It should be noted that although specific implementations of speaker systems primarily serving the purpose of acoustically outputting audio are presented with some degree of detail, such presentations of specific implementations are intended to facilitate understanding through provision of examples and should not be taken as limiting either the scope of disclosure or the scope of claim coverage.

Figure 3:
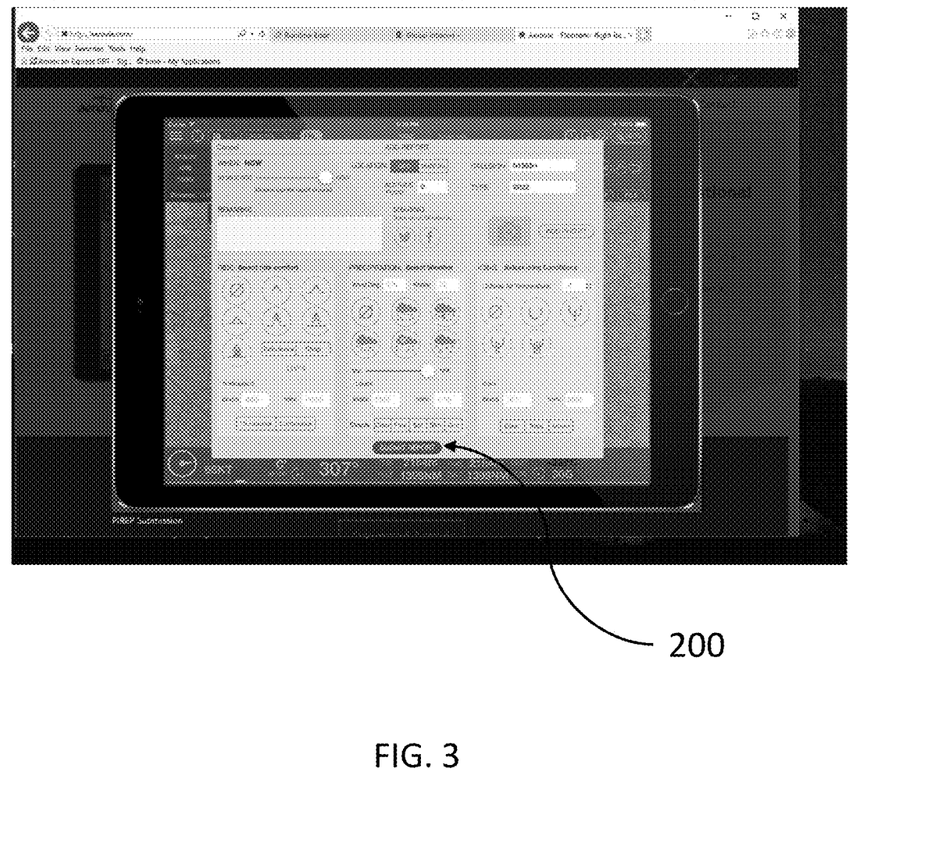
FIG. 3 is a graphical user interface on an electronic flight bag of a PIREP, in accordance with an example.
Figure 4:
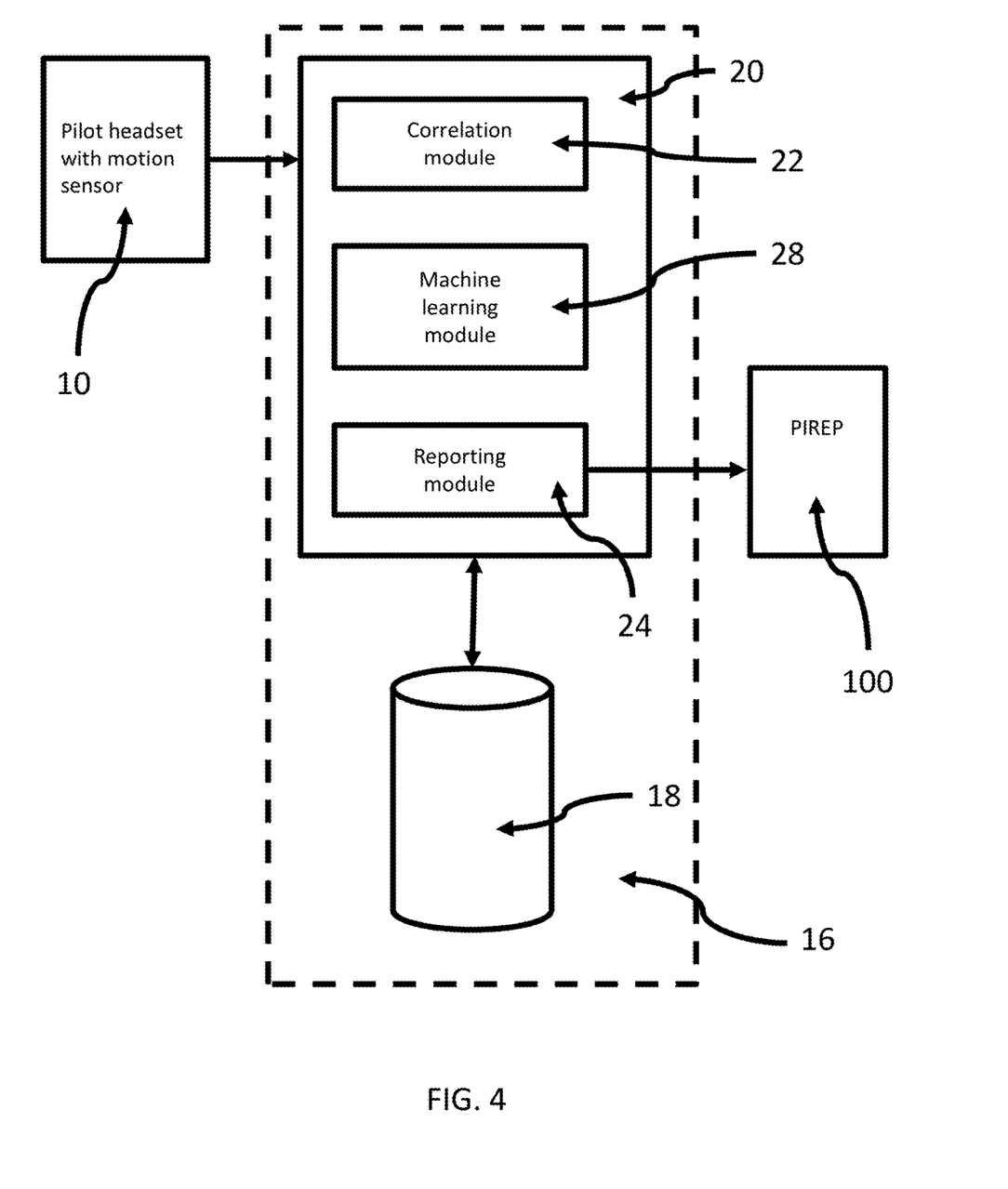
FIG. 4 is a block diagram, in accordance with an example.

With reference to FIG. 4, the motion data that is sensed by sensor 12 is sent to a motion data correlation computer module positioned on or within the headset (not shown) or transmitted via a transmitter 14 (either wirelessly or via hard-wire connection) to the aircraft panel, to a separate computing device (e.g., a mobile phone, tablet, or other computer), or the electronic flight bag 200 as illustrated in FIG. 3. It should be noted that electronic flight bag 200 is a conventional electronic information management device that helps flight crews perform flight management tasks more easily and efficiently with less paper. It is a general purpose computing platform intended to reduce, or replace, paper-based reference material often found in the pilot's carry-on flight bag, including the aircraft operating manual, flight-crew operating manual, and navigational charts (including moving map for air and ground operations). In addition, electronic flight bag 200 can host purpose-built software applications, as with the present invention, to automate other functions normally conducted by hand, such as performance take-off calculations. From the panel, separate computing device, or electronic flight bag 200, the data is transmitted to and stored in the non-volatile memory of a computer 16 (which may be a part of the electronic flight bag/panel 200 or separate). Computer 16 further includes a database 18 (either internal within memory or external which it can electronically access) that has stored thereon baseline motion data (e.g., motion data in the X, Y, and Z axes that correlate with various air conditions, for example normal air conditions, light, moderate, severe and extreme turbulence conditions). A computer program product 20 stored in computer 16 and the computer's processor include a correlation module 22 that will correlate the collected motion data with the stored baseline motion data and determine the appropriate turbulence level to assign to the to the collected motion data. The correlation module 22 accounts for movement of the pilot's head (e.g., head nods, head shakes, or any other movements of the head) so that such movements will not be correlated as indicative of turbulence. As illustrated in FIGS. 4 and 5, motion data may be correlated with a turbulence intensity level (e.g., light, moderate, severe, or extreme) based on the motion sensed at the headset of the pilot. For example, if the sensor 12 senses motion that is a slight, erratic change in altitude or attitude (pitch, roll or yaw), computer program 18 may correlate the data with light turbulence. This may be achieved by taking the X, Y, and Z acceleration data collected from motion sensor 12 over time, averaging the data and then comparing the actual data to a baseline level of acceleration in the X, Y, and Z axes indicative of normal movement, light, moderate, severe, and extreme turbulence.

Computer program 20 further comprises a reporting module 24 that will automatically populate a PIREP 100 with the turbulence data in section "/TB", as reflected in the example form shown in FIG. 2. It is noted that all other sections of the PIREP 100 can also be automatically completed (e.g., by collecting data with pre-existing sensors equipped on aircraft) without manual entry by the pilot at the time of flying, aside from the "Remarks" section. Thus, with the turbulence section of the PIREP 100 being automatically completed, most of the remainder of the PIREP can also be automatically completed. In one example, once the pilot verifies the accuracy of the assigned turbulence level in computer program 20, the PIREP 100 can be made available for other aircraft flying in the same general vicinity in real-time.

A machine learning module 28 can also be incorporated into computer program product 20 and used to continuously improve the accuracy of the turbulence reporting based on motion data collected over time and stored in database 24. As more and more data is collected using the motion sensor 12 equipped headset 10, when coupled with other data, such as weather and location data, the program can become more accurate at correlating the sensed data to turbulence levels.

Figure 6:
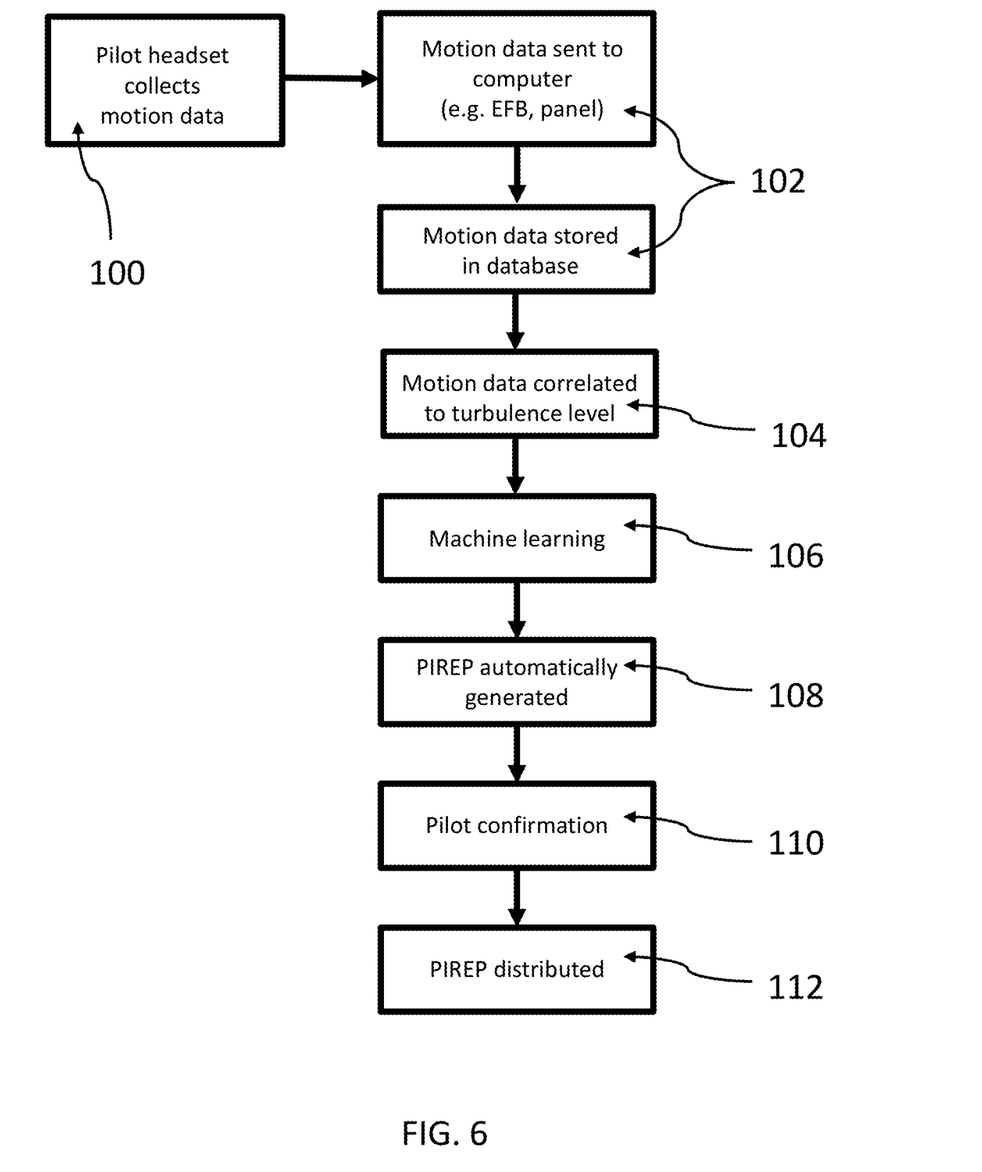
FIG. 6 is a block diagram, in accordance with an example.

FIG. 6 illustrates a flowchart describing a method for generating a turbulence report. In step 100, a pilot headset 10 equipped with a motion sensor 12 collects motion data (for example in the X, Y, and Z axes). In step 102, the motion data is transmitted and optionally stored in the memory of a computer 16. In step 104, a motion data correlation module 22 correlates the collected motion data with baseline motion data stored in database 18, and assigns a turbulence level to the collected motion data set. In optional step 106, a machine learning module 28 identifies pilot reactions versus the real conditions and updates and improves upon the comparisons made by the correlation module 22. In step 108, the PIREP 100 can be automatically populated with the turbulence level (and other sensed parameters). In optional step 110, a pilot verifies the turbulence level assigned to the collected motion data, and the PIREP is made available for others in step 112.

Figure 7:
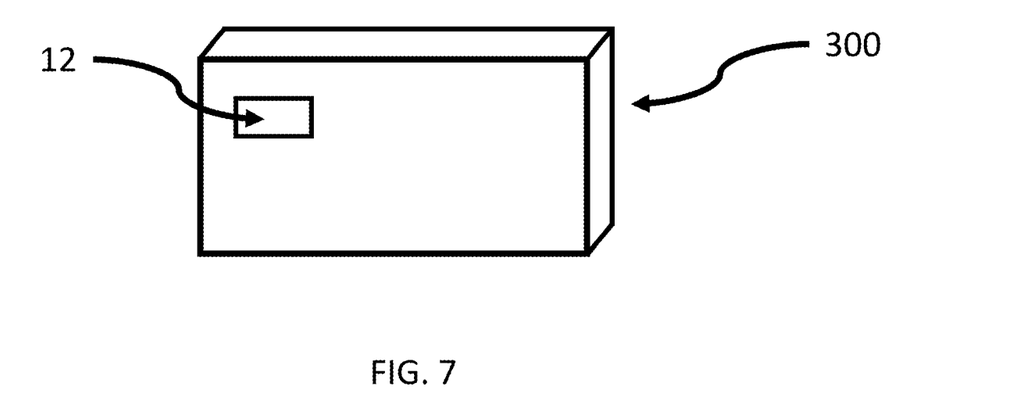
FIG. 7 is a schematic representation of a motion sensor module, in accordance with an example.

With reference to FIG. 7, sensor 12 may be packaged as a module 300 adapted for operable interconnection to headset 10. Module 300 is structured to draw power and communication functions to the electronic flight bag 200 via the headset 10. Thus, configuration of the module 300 is dependent on the headset 10 for processing, power and communication to the electronic flight bag 200.

The above-described examples of the described subject matter can be implemented in any of numerous ways. For example, some examples may be implemented using hardware, software or a combination thereof. When any aspect of an example is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, other examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A headset system, comprising:
    a headset body having a motion sensor in communication therewith and configured to collect headset motion data representative of changes in motion of the headset body;
    a motion data correlation module programmed, structured and/or configured to correlate the collected headset motion data to turbulence level data, wherein the motion data correlation module is further programmed to exclude collected motion data corresponding to pilot head movement.

2. The headset system of claim 1, wherein the motion sensor is adapted to collect headset motion data in each of the X, Y, and Z axes.

3. The headset system of claim 1, wherein the motion data correlation module is positioned on or within the headset body.

4. The headset system of claim 1, wherein the motion data correlation module is located remotely from the headset body.

5. The headset system of claim 4, further comprising a transmitter for wirelessly transmitting the headset motion data from the motion sensor to the motion data correlation module.

6. The headset system of claim 4, further comprising a wired connection between the motion sensor and the motion data correlation module.

7. A system for reporting turbulence data, comprising:
    a headset having a motion sensor in communication therewith and configured to collect headset motion data representative of changes in motion of the headset body;
    a motion data correlation module programmed, structured and/or configured to correlate the collected headset motion data to turbulence level data, wherein the motion data correlation module is further programmed to exclude collected motion data corresponding to pilot head movement; and
    a pilot reporting module adapted to receive the turbulence level data and generate a pilot report based on the turbulence level data.

8. The system of claim 7, wherein the motion sensor is adapted to collect headset motion data in each of the X, Y, and Z axes.

9. The system of claim 8, further comprising a database in which is stored baseline data of motion changes in the X, Y, and Z axes and corresponding turbulence levels.

10. The system of claim 9, wherein the motion data correlation module compares the collected X, Y, and Z axis headset motion data to the baseline of X, Y, and Z motion data stored in the database for correlating the collected motion data to the corresponding turbulence levels.

11. The system of claim 7, further comprising a transmitter for wirelessly transmitting the headset motion data to the motion data correlation module.

12. The system of claim 7, further comprising a wired connection between the motion sensor and the motion data correlation module.

13. The system of claim 7, further comprising a transmitter for wirelessly transmitting the pilot report to a receiving station.

14. The system of claim 7, wherein said motion sensor is packaged in a module adapted to connect and draw power and communication functions to the pilot reporting module via the headset.

15. A method for generating a turbulence report, comprising the steps of:
    collecting headset motion data in a pilot headset representative of changes in motion of the headset;

correlating the collected headset motion data to turbulence data, wherein the collected motion data corresponding to pilot head movement is excluded from the correlating step;

reporting the turbulence data to a pilot reporting module and generating a pilot report based on the turbulence data.

16. The method of claim 15, further comprising the step of providing a database that has stored therein baseline data of motion changes in the X, Y, and Z axes and corresponding turbulence levels.

17. The method of claim 16, wherein the step of collecting motion data comprises collecting headset motion data in the X, Y, and Z axes.

18. The method of claim 17, further comprising the step of comparing the collected X, Y, and Z axis headset motion data to the baseline data of motion changes in the X, Y, and Z axes for correlating to a turbulence level.

19. The method of claim 15, wherein the step of correlating the collected headset motion data comprises using a motion data correlation module programmed, structured and/or configured to correlate the collected headset motion data to turbulence level data.

20. The method of claim 19, further comprising the step of assigning a turbulence level based on a correlation of the collected headset motion data to the turbulence level data.

\* \* \* \* \*